United States Patent Office 3,705,171
Patented Dec. 5, 1972

3,705,171
PREPARATION OF 2-SUBSTITUTED-5-AMINO OR SUBSTITUTED AMINO-1,3,4-THIADIAZOLES
Christos George Papaioannou, Somerset, N.J., assignor to American Cyanamid Company, Stamford, Conn.
No Drawing. Filed May 18, 1970, Ser. No. 38,511
Int. Cl. C07d 91/62
U.S. Cl. 260—306.8 D      7 Claims

ABSTRACT OF THE DISCLOSURE

The reaction of a substituted nitrile with thiosemicarbazide or a substituted thiosemicarbazide to produce 2-substituted - 5 - amino or substituted amino - 1,3,4 - thiadiazoles is described.

The compounds prepared by the present invention are useful as intermediates in preparing antibacterial agents, such as sulfamethizole.

DESCRIPTION OF THE INVENTION

This invention described the preparation of substituted thiadiazoles. More particularly, it relates to a novel process for the preparation of 2-substituted-5-amino or substituted amino-1,3,4-thiadiazoles.

The process of the present invention is useful in the preparation of compounds of the formula:

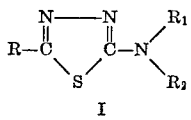

I wherein R is selected from the group consisting of lower alkyl ($C_1$–$C_4$), loweralkoxyloweralkyl ($C_2$–$C_8$), phenyl, nitrophenyl and halophenyl and $R_1$ and $R_2$ are selected from the group consisting of hydrogen and lower alkyl.

The starting materials for the process of the present invention are substituted nitriles wherein the substituents may be aromatic or aliphatic. Among these nitriles may be, for example, acetonitrile, propionitrile, butyronitrile, β-isopropoxypropionitrile, propoxypropionitrile, benzonitrile, p-nitrobenzonitrile, p-chlorobenzonitrile, p-bromobenzonitrile, p-iodobenzonitrile, p-fluorobenzonitrile, m-nitrobenzonitrile and the like. These nitriles can be illustrated by the formula

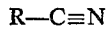

II wherein R is as described above.

In the present process the nitriles are reacted with a thiosemicarbazide of the formula:

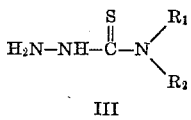

III wherein $R_1$ and $R_2$ are as described hereinbefore. Among these thiosemicarbazides may be, for example, thiosemicarbazide, 4,4 - dimethylthiosemicarbazide, 4,4 - diethylthiosemicarbazide, 4 - methyl - 4 - ethylthiosemicarbazide, 4,4 - dipropylthiosemicarbazide, 4 - ethyl - 4 - propylthiosemicarbazide, 4,4 - diisopropylthiosemicarbazide, 4,4-dibutylthiosemicarbazide and the like.

The process of the present invention is carried out by contacting a nitrile (Compounds II) with a thiosemicarbazide (Compounds III) in the presence of a strong acid. The strong acid may be either a mineral acid or an organic acid such as, for example, sulfuric acid, hydrogen chloride, hydrogen bromide, hydrogen fluoride, trifluoroacetic acid or trichloroacetic acid. For convenience, the reaction may be carried out in an inert solvent, such as, for example, dimethylformamide or dimethylacetamide. The reaction also can be conducted in water.

The present reaction may be illustrated as follows:

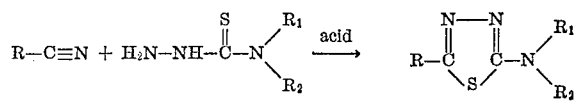

The reaction may be carried out at a temperature within the range of about 0° C. to about 120° C. However, the preferred range and the time required to carry out the reaction depend to a great extent on the particular acid and solvent used in the synthesis, as well as the pressure. With liquid hydrogen fluoride the temperature can be from 0° C. to about 25° C., whereas with trifluoroacetic acid it may be from about 0° C. to about 75° C., the upper limit being determined by the boiling point of the acid at atmospheric pressure. Higher reaction temperatures may be achieved by the use of pressure.

In most instances it is expedient to conduct the reaction at atmospheric pressure; however, when desirable, several atmospheres of pressure, generally not exceeding about 10 atmospheres, can be used.

The reaction may be completed in from 1 to about 120 hours, depending on the acid used and the reaction temperature.

The present invention provides a novel process for the direct preparation of 2-substituted-5-disubstituted amino-1,3,4-thiadiazoles by condensation of nitriles of Formula II with a thiosemicarbazide of Formula III and cyclizing the incipient intermediate in a single step under relatively simple reaction conditions. Thus, the present process results in considerable economic advantages. The process is highly effective for the preparation of compounds of Formula I which are useful intermediates for the preparation of bacteriocidal agents, e.g., sulfa drugs, which have the formula:

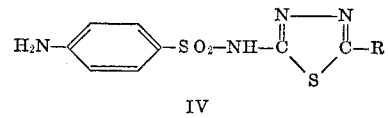

IV

In the above formula, R is as hereinbefore defined. The sulfa drug, sulfamethizine, is illustrated in the above formula when R is methyl. Sulfamethizine is prepared by reacting 2-amino-5-methyl thiadiazole with acetylsulfanilyl chloride in the presence of alkali to neutralize the hydrogen chloride formed and subsequently removing the acetyl group by hydrolysis as described hereinafter.

DETAILED DESCRIPTION

The following examples describe in detail the preparation of the 2,5-disubstituted thiadiazoles of this invention.

EXAMPLE 1

Preparation of 2-methyl-5-amino-1,3,4-thiadiazole

A mixture of 6.0 grams (0.145 mole) of acetonitrile, 13.2 grams (0.145 mole) of thiosemicarbazide and 20 ml. of hydrogen fluoride is reacted for about 7 days at room temperature. The hydrogen fluoride is then removed by evaporation, 30 ml. of water added and the pH adjusted to 6 by the addition of ammonium hydroxide. The resulting product is filtered, washed with water, and dried. There is obtained 14.1 grams (84.5%) of the title compound, melting point 221–223° C. The infrared spectrum is identical with that of an authentic sample of the compound.

EXAMPLE 2

Preparation of 2-ethyl-5-amino-1,3,4-thiadiazole

Following the procedure of Example 1 except for the use of 0.145 mole of propionitrile in place of acetonitrile, the title compound is obtained, melting point 195–197° C., following reaction for 6 days at room temperature.

EXAMPLE 3

Preparation of 2-methyl-5-amino-1,3,4-thiadiazole

A mixture of 4.55 g. (0.050 mole) of thiosemicarbazide, 20 ml. of acetonitrile and 20 ml. of concentrated sulfuric acid is reacted at room temperature for 16 hours. The mixture is neutralized with ammonium hydroxide and evaporated to dryness under vacuum. The residue is extracted with methanol and the methanol solution concentrated under vacuum to afford 2-methyl-5-amino-1,3,4-thiadiazole, melting point 222–223° C.

EXAMPLE 4

Preparation of 2-methyl-5-amino-1,3,4-thiadiazole

A mixture of 1.49 g. (0.0363 mole) of acetonitrile, 3.3 g. (0.0363 mole) of thiosemicarbazide and 10 ml. of trifluoroacetic acid is refluxed for 7 hours. There is obtained 1.6 g. of 2-methyl-5-amino-1,3,4-thiadiazole, melting point 222–224° C.

EXAMPLE 5

Preparation of 2-ethyl-5-amino-1,3,4-thiadiazole

Following the procedure of Example 4 but substituting an equimolar quantity of propionitrile for acetonitrile, the title product is obtained, melting point 196–197° C.

EXAMPLE 6

Preparation of 2-(beta-isopropoxyethyl)-5-amino-1,3,4-thiadiazole

A mixture of 2.00 g. (0.0177 mole) of beta-isopropoxypropionitrile, 1.61 g. (0.0177 mole) of thiosemicarbazide and 10 ml. of trifluoroacetic acid is refluxed for 15 hours. There is obtained a 53% yield of 2-(beta-isopropoxyethyl)-5-amino-1,3,4-thiadiazole, melting point 138–139° C. (from isopropylacetate).

EXAMPLE 7

Preparation of 2-phenyl-5-amino-1,3,4-thiadiazole

Following the procedure of Example 6 but substituting an equimolar quantity of benzonitrile for beta-isopropoxypropionitrile, the title product is obtained. After successive recrystallizations from methanol and isopropyl alcohol pure product is obtained, melting point 162–163° C.

EXAMPLE 8

Preparation of 2-(p-nitrophenyl)-5-amino-1,3,4-thiadiazole

A mixture of 1.96 g. (0.0132 mole) of p-nitrobenzonitrile, 1.32 g. (0.0144 mole) of thiosemicarbazide and 15 ml. of hydrogen fluoride is reacted at room temperature for 2.2 days. The reaction mixture is drowned in an ice-water mixture and the product filtered and washed with water. Recrystallization from nitromethane gives bright yellow needles, melting point 264–265° C.

EXAMPLE 9

Preparation of 2-(p-chlorophenyl)-5-amino-1,3,4-thiadiazole

Following the procedure of Example 8 but substituting an equimolar quantity of p-chlorobenzonitrile for para-nitrobenzonitrile, the title product is obtained. After recrystallization from methanol it had a melting point of 232–233° C.

EXAMPLE 10

Preparation of 2-(m-nitrophenyl-5-amino-1,3,4-thiadiazole

Following the procedure of Example 8 but substituting an equimolar quantity of m-nitrobenzonitrile for p-nitrobenzonitrile a 76% yield of the title product is obtained. Recrystallization from a mixture of ethyl acetate and acetone gives the pure compound, melting point 225–226° C.

EXAMPLE 11

Preparation of 2-methyl-5-dimethylamino-1,3,4-thiadiazole

Following the procedure of Example 1 but substituting an equimolar quantity of 4,4-dimethylthiosemicarbazide for thiosemicarbazide the title product is obtained.

EXAMPLE 12

Preparation of 2-sulfanilamide-5-ethyl-1,3,4-thiadiazole (A) Preparation of 2-($N_4$-acetylsulfanilamido)-5-ethyl-1,3,4-thiadiazole.—2-ethyl-5-amino-1,3,4-thiadiazole (106 g.) and pyridine (306 ml.) are mixed and the slurry cooled to 10° C. Acetylsulfanilyl chloride (228 g.) is added slowly with stirring and cooling over a period of 15 minutes, keeping the temperature below 25° C. during the addition. The mixture is heated to 40° C. and stirred for 4 hours. Hot water (1500 ml.) is added and the slurry heated to 90° C. Caustic soda (100 ml. of 50% solution) is added slowly to obtain a pink test on phenolphthalein paper.

The pyridine is steam distilled and the solution cooled to 85° C.; lime (0.4 g.), sodium hydrosulfate (1.0 g.), and activated carbon (10 g.) are added. The mixture is stirred at 80–85° C. for 15 minutes, then clarified.

The filtrate is heated to 80° C. and acidified to a pH of 4.0–4.5 with 15–20% sulfuric acid. The resulting slurry is cooled to 20° C. and the product filtered, washed with cold water and dried. There is obtained 249 g. (93%) melting point 193.9–195.1° C.

(B) Preparation of 2-sulfanilamido-5-ethyl-1,3,4-thiadiazole.—Water (200 ml.) and 130 g. of the product from (A) are charged to a flask and caustic soda (21 ml. of 50% solution) added to obtain a pink spot on benzoazurine test paper. The solution is diluted to 570 ml. with water, 4.3 g. of activated carbon added, and the mixture heated for 30 minutes at 80–85° C. with stirring. The reaction mixture is filtered and washed with 50 ml. of hot water.

An additional 32 ml. of 50% caustic soda is added to the combined filtrate, and the reaction mixture heated to 102° C. for 3 hours. The reaction mixture is cooled to 85° C. and 100 ml. of warm water added. The pH is adjusted to obtain a slight pink spot on benzoazurine paper. The solution is again clarified with charcoal, filtered, the filter cake washed with warm water and the combined filtrate heated to 70° C. The pH is adjusted with dilute sulfuric acid to 4.5, the slurry cooled to 10° C., and filtered. The product is washed with cold water and dried. There is obtained 107.5 g. (95.7%) of product, melting point 188–189° C.

EXAMPLE 13

Preparation of 2-phenyl-5-amino-1,3,4-thiadiazole

A solution of benzonitrile (2.06 g., 0.02 ml.), thiosemicarbazide (1.82 g., 0.02 m.), water (3.0 g., 0.167 m.) and hydrogen fluoride, 10 ml., is reacted at 22° C. for 23 hours and drowned into 250 ml. of water. The pH of the reaction mixture is adjusted to 8.5 with 28% ammonium hydroxide. The resulting crystalline precipitate is filtered, washed with water and dried. There is obtained 2.9 g. (82%) of 2-phenyl-5-amino-1,3,4-thiadiazole, melting point 229–230° C.

I claim:
1. A process for the preparation of aminothiadiazoles of the formula:

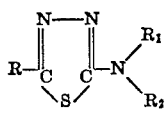

wherein R is loweralkyl ($C_1$–$C_4$), loweralkoxyloweralkyl ($C_2$–$C_8$), phenyl, nitrophenyl or halophenyl and $R_1$ and $R_2$ are hydrogen or lower alkyl, which comprises reacting a nitrile of the formula:

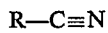

wherein R is as described above, directly with a thiosemicarbazide of the formula:

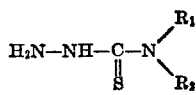

wherein $R_1$, $R_2$ are as described above in the presence of a strong acid at a temperature of from about 0° C. to about 120° C. until a substantial amount of product has formed and recovering said product therefrom.

2. A process according to claim 1, wherein the nitrile is selected from the group consisting of acetonitrile, propionitrile, beta-isopropoxypropionitrile, benzonitrile, p-nitrobenzonitrile, m-nitrobenzonitrile, and p-chlorobenzonitrile, and the acid is a mineral acid or a strong organic acid.

3. A process according to claim 1, wherein the thiosemicarbazide is selected from the group consisting of thiosemicarbazide, 4-methylthiosemicarbazide, and 4,4-dimethylthiosemicarbazide, and the acid is a mineral acid or strong organic acid.

4. A process according to claim 1, wherein the acid is concentrated sulfuric acid.

5. A process according to claim 1, wherein the acid is liquid hydrogen fluoride and the reaction is conducted at a temperature within the range of about 0° C. and 25° C.

6. A process according to claim 1, wherein the acid is trifluoroacetic acid and the reaction is conducted at a temperature within the range of about 0° C. and 75° C.

7. A method of preparing 2-methyl-5-amino-1,3,4-thiadiazole which comprises reacting acetonitrile directly with thiosemicarbazide in liquid hydrogen fluoride at a temperature of about 0° C. to 25° C. for a period of time from 1 hour to about 120 hours and recovering the product therefrom.

References Cited
UNITED STATES PATENTS

| | | | |
|---|---|---|---|
| 2,943,980 | 7/1960 | Maffii et al. | 260—306.8 D |
| 3,161,505 | 12/1964 | Tomanek | 260—306.8 D |
| 3,332,942 | 7/1967 | Brevivogel | 260—306.8 D |
| 3,419,575 | 12/1968 | Griss | 260—306.8 D |

OTHER REFERENCES

Elderfield (ed.), Heterocyclic Compounds, vol. 7, Wiley, New York, 1961, p. 590.

ALEX MAZEL, Primary Examiner
R. J. GALLAGHER, Assistant Examiner

U.S. Cl. X.R.
260—239.95